Figure 1:
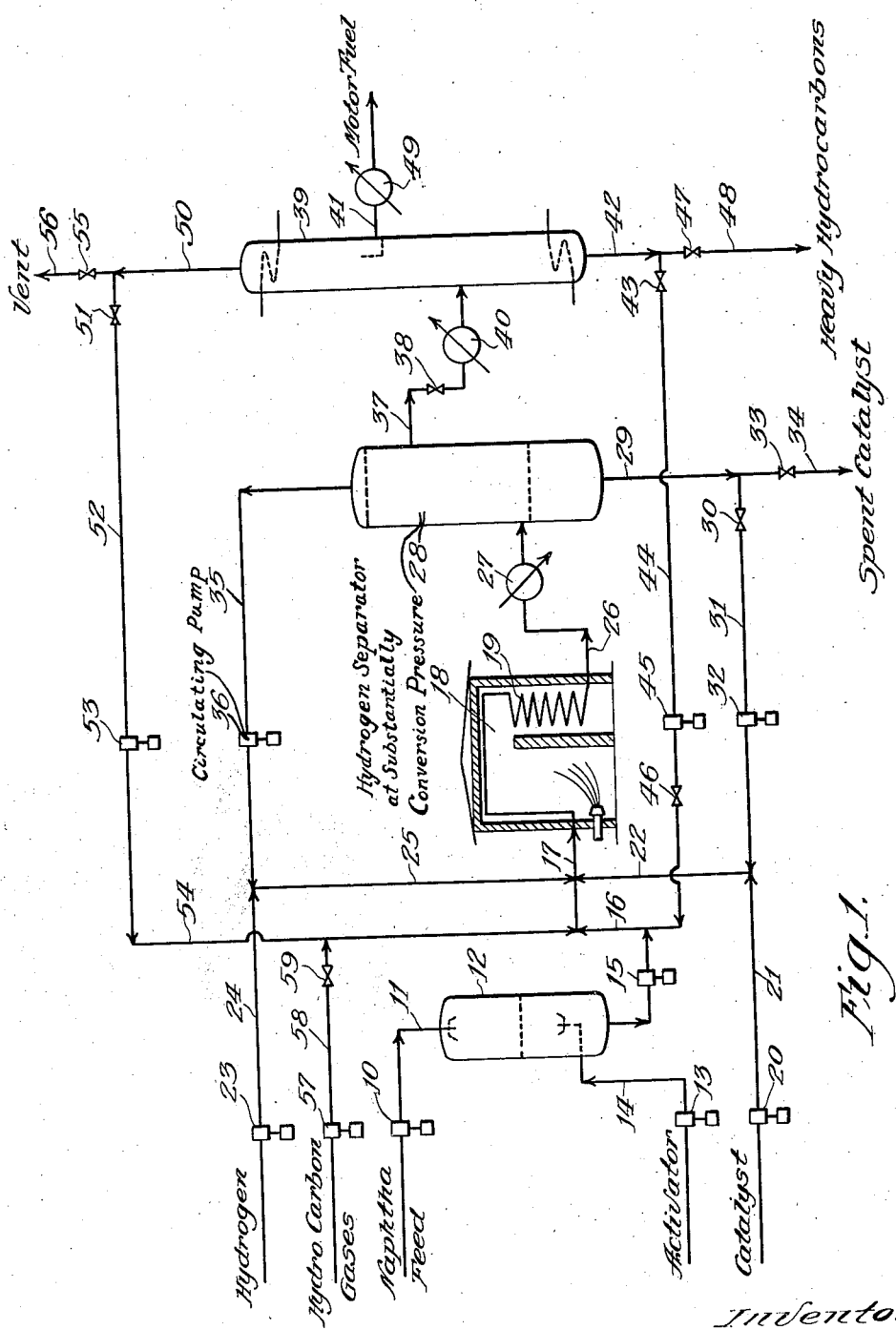

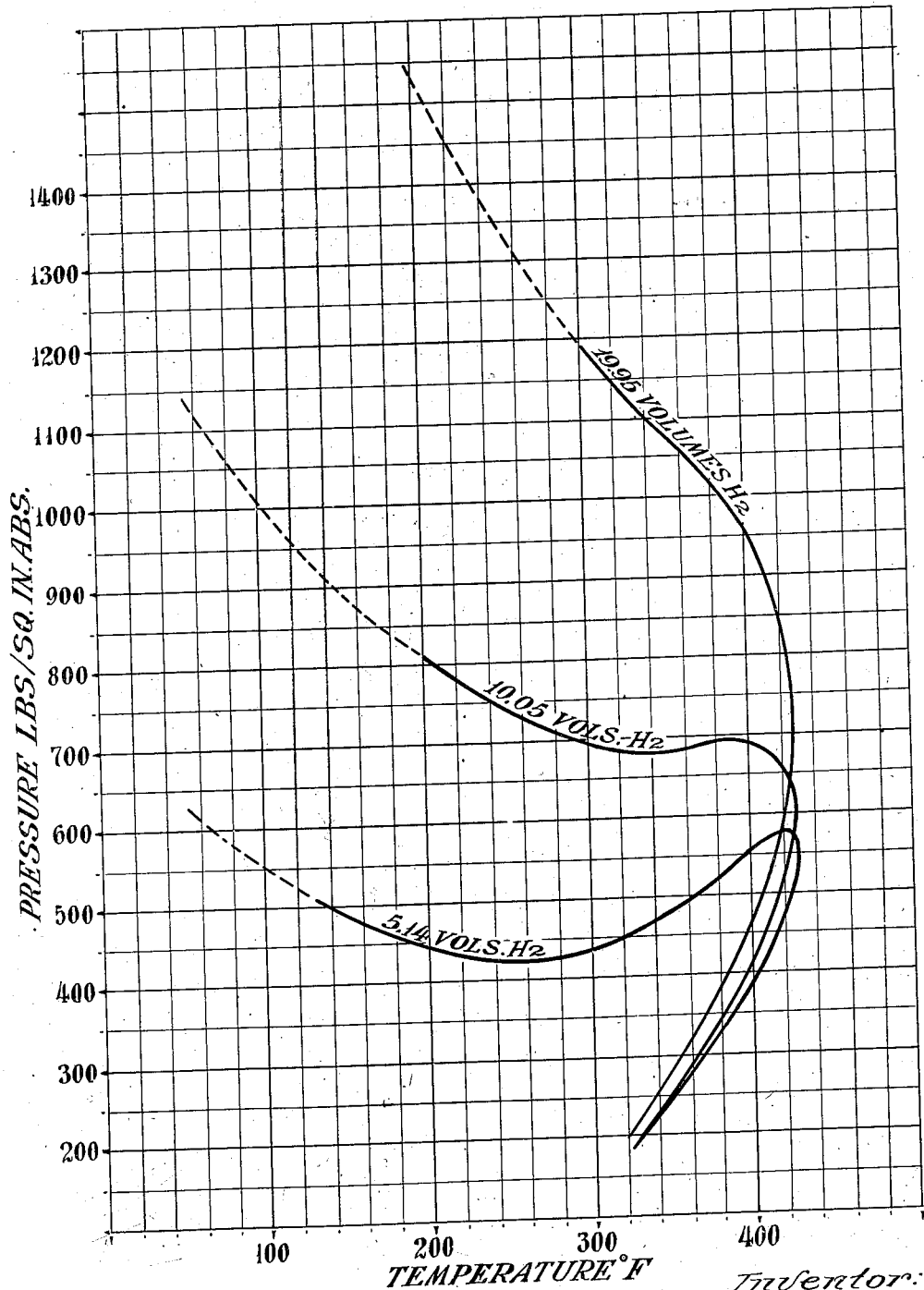

Patented Sept. 5, 1944

2,357,521

UNITED STATES PATENT OFFICE 2,357,521

ISOMERIZING PARAFFINIC NAPHTHAS

Webster B. Kay, Chicago, Ill., assignor to Standard Oil Company, Chicago, Ill., a corporation of Indiana Application September 26, 1940, Serial No. 358,397

9 Claims. (Cl. 196—78)

This invention relates to the isomerization of substantially saturated naphthas rich in straight-chain paraffin hydrocarbons and more particularly to a process for converting substantial portions of the straight-chain paraffin hydrocarbons in a petroleum naphtha to branched-chain paraffin hydrocarbons in the presence of an active aluminum halide catalyst. Still more specifically, it relates to a conversion process of this type in which the reaction is carried out in the presence of free hydrogen and to a novel method of separating a considerable proportion of this hydrogen from the products and returning it to the reaction zone.

It is well-known that the branched-chain paraffin hydrocarbons and napththas containing them in substantial proportions are very valuable as motor fuels and particularly as airplane fuels because of their high antiknock values, freedom from gum-forming tendencies and high heat contents per unit weight of fuel. As is now well known in the art, such naphthas can be produced from substantially saturated liquid fractions rich in straight-chain paraffin hydrocarbons by the action of aluminum chloride or other active aluminum halide catalyst in the presence of an activator such as hydrogen chloride. In carrying out a process of this type it is extremely advantageous to supply free hydrogen to the reaction zone under pressure in order to prevent the rapid degradation of the aluminum halide-hydrocarbon complex formed during the reaction to an inactive sludge, since this degradation has been a major factor in the extremely low yields of product obtained per unit of catalyst consumed by prior methods. It is also very desirable to cary out the reaction on a continuous basis with all of the reactants, including the hydrogen, in the liquid phase in order to obtain a maximum of contact between them. However, it has been found that the amount of hydrogen actually consumed during the reaction is very small when compared with the amount that must be supplied to maintain the activity of the catalyst to an economical degree.

I have found that a substantial proportion of the free hydrogen remaining in the products from an isomerization reaction of the type described can be separated therefrom by cooling without substantial pressure reduction, so that the hydrogen thus separated can immediately be recycled at relatively low cost.

It is an object of my invention to provide a process for isomerizing paraffinic naphthas with exceptionally high yields per unit of catalyst consumed and in the most economical manner. Another object is to provide a process whereby naphthas having low antiknock values due to their content of straight-chain paraffin hydrocarbons are converted into high antikock motor fuel fractions in the presence of an active aluminum halide catalyst and an activator. A still further and more specific object is to provide a process of the type described in which hydrogen is present and in which this hydrogen is separated and recycled in a particularly efficient and inexpensive manner. Other objects, advantages and uses of my invention will appear from the following detailed description read in conjunction with the drawings which form a part of this specification and in which Figure 1 shows in a schematic manner an apparatus suitable for carrying out my invention, and Figure 2 is a graph showing a family of border curves of mixtures of free hydrogen and a certain straight-run light naphtha.

In one of its broad aspects my invention comprises contacting an admixture of a substantially saturated naphtha rich in straight-chain paraffin hydrocarbons, an active aluminum halide catalyst, an activator affording a hydrogen halide, and free hydrogen in a reaction zone under conditions suitable for the isomerization of straight-chain to branched-chain paraffin hydrocarbons and under which the free hydrogen is largely dissolved in the naphtha, cooling the products from the reaction zone, separating a hydrogen-rich gas therefrom while maintaining the pressure and returning this hydrogen-rich gas to the reaction zone.

The feed stock to my process can be any substantially saturated naphtha rich in straight-chain paraffin hydrocarbons. For example, it can be a relatively pure normally liquid straight-chain paraffin hydrocarbon such as normal pentane, normal hexane or normal heptane, but generally predominantly paraffinic straight-run naphthas such as those from Michigan, Pennsylvania or Mid-Continent crude oil are preferred since they are much more readily available. Another excellent feed stock is the highly paraffinic naphtha produced by the Fischer-Tropsch process from carbon monoxide and hydrogen. Natural gasoline fractions and so-called "distillates" are also suitable and are plentiful and inexpensive in some production areas. It is very important that the feed stock be free or almost free from aromatic hydrocarbons since they have been found to reduce the activity of the catalyst to a very marked degree and consequently to limit seriously the amount of conversion obtained per unit weight of catalyst. My preferred feed stock therefore contains less than 5% and preferably 0.5-1.0% or less of aromatic hydrocarbons. In many cases a preliminary solvent extraction step or other treatment is necessary or desirable to reduce the aromatic content of the feed to a value sufficiently low to minimize interference with the catalyst activity. Olefinic hydrocarbons are also very undesirable and should not be present in more than very small amounts. While cycloparaffinic hydrocarbons are not injurious to the catalyst life and can be tolerated in considerable quantities, nevertheless, the feed stock should preferably contain at least 50% of paraffin hydrocarbons and those containing at least 80% of paraffin hydrocarbons are especially desirable.

In general the naphtha feed stock should have a boiling range within the range from about 100° F. to about 500° F., although naphthas having an initial boiling point in the neighborhood of 30° F. and including up to about 25-30% by weight of butanes may be used. A particularly suitable naphtha feed is one prepared by the distillation and fractionation of a straight run or natural gasoline stock to produce a light naphtha having an initial boiling point in the range from about 30° F. to about 90° F. and an end point in the range from about 145° F. to about 158° F., preferably about 152° F. Substantially all of the aromatic hydrocarbons and most of the naphthenic hydrocarbons, such as cyclohexane, are excluded from this fraction and it is very rich in straight-chain paraffin hydrocarbons.

The active aluminum halide catalyst used in carrying out my invention can be, for example, aluminum chloride or aluminum bromide in anhydrous form, and it can be introduced into the reaction zone in the form of a slurry or solution, for instance, in a portion of the feed stock. However, it can also be used in the form of a liquid aluminum halide-hydrocarbon complex and, as will be brought out below, the catalyst complex formed during the reaction maintains its activity for a considerable period of time and is useful for further conversion of straight-chain paraffins. Other aluminum halide complexes can likewise be used or the reacting hydrocarbons can be caused to flow through a bed of aluminum chloride mounted on a support such as active carbon, various types of clays, etc.

The concentration of catalyst present in the reaction zone can vary within wide limits, depending primarily upon the temperature, reaction time and catalyst activity or "freshness." Generally the catalyst concentration will be within the range from about 5% to about 30% by weight of the liquid hydrocarbons present, although larger or smaller amounts can be used if the other conditions are controlled in accordance therewith. It will be understood that the actual catalyst consumption will be considerably lower, and generally within the range from about 0.1% to about 5.0% by weight.

The activator supplied to the reaction zone is a substance affording a hydrogen halide under the conditions prevailing therein, which can be either a hydrogen halide itself, such as hydrogen chloride or hydrogen bromide, or it can be carbon tetrachloride or one of the alkyl halides such as methyl chloride or bromide, ethyl chloride or bromide, etc. In general the chlorinated and brominated hydrocarbons, particularly the more volatile ones, are suitable, and even water can be used since a hydrogen halide will be generated therefrom by reaction with the catalyst, but this is not preferred since the catalyst is thus deactivated more rapidly than would otherwise be the case. Preferably the amount of activator used is sufficient to supply a concentration in the reaction zone of about 1 to 2 mols of hydrogen halide per mol of aluminum halide, which will usually be in the range from about 0.1% to 5.0% by weight, based on the reacting hydrocarbons present.

As hereinabove stated, the isomerization reaction is carried out in the presence of free hydrogen which is supplied under a relatively high pressure in the range from about 250 to about 3000 pounds per square inch. Preferably, however, hydrogen pressures in the range of from about 500 to about 1500 pounds per square inch are employed. Relatively pure hydrogen is, of course, particularly suitable but in the plant operation of my process hydrogen containing relatively small amounts of impurities such as methane is available at much lower cost and can be use effectively.

As mentioned above, the hydrogen in the reaction zone should be largely dissolved in the naphtha. Generally, the amount of free hydrogen present is less than about 50 volumes of gaseous hydrogen measured at 60° F. per volume of liquid naphtha and preferably it lies in the range from about 10 to 25 volumes of hydrogen per volume of naphtha, although under some circumstances smaller amounts can be used. The solubility relationship of hydrogen and a particular straight-run light naphtha derived from Mid-Continent crude oil having an end point in the neighborhood of 152° F. is illustrated in Figure 2, which shows a family of border curves of mixtures of free hydrogen and a straight run light naphtha. These border curves define the pressure-temperature regions wherein a mixture of given composition exists in equilibrium as liquid, vapor, and liquid-vapor respectively. Above each of these curves the mixture exists entirely as a liquid. To the right of these curves the mixture exists entirely as a vapor. Below the upper part of the curves and to the left of the lower part of the curves, i. e., in the area bounded by the curves, the mixture exists as a liquid plus vapor phase. This is illustrated in Figure 3 of my paper entitled "Some peculiarities in the P-T border curves of mixtures of hydrogen and a petroleum naphtha" published in Chemical Reviews, volume 29, No. 3, December 1941 on page 505. The border curves in Figure 2 of this application show that a 300° F. and about 700 pounds per square inch approximately 10 volumes of hydrogen are soluble in 1 volume of naphtha and at about 1200 pounds per square inch and 300° F. approximately 20 volumes are soluble. It is therefore apparent that it is quite possible to carry out the isomerization reaction under the conditions herein specified, while maintaining the hydrogen present largely in the liquid phase so that it is most effective in retarding the deactivation of the catalyst. It is, of course, necessary to design the apparatus so that the reaction zone contains little or no vapor space, but this is very simple, especially if continuous operation is employed.

Another important variable which influences the course of the reaction is temperature. In general, temperatures ranging from about 100° F. to about 400° F. are suitable, although different reaction times and amounts of catalyst are almost imperative in order that economically practicable results may be obtained at various temperatures. Usually it is preferred to carry out the reaction in the range from about 200° F. to about 350° F. in order that it may proceed rapidly and without drastic over-treatment. In the upper portion of the broad temperature range specified the tendency toward decomposition into normally gaseous hydrocarbons such as isobutane can be inhibited by supplying a relatively small quantity of one of the butanes to the reaction zone.

It is apparent that the process above described can be carried out either batchwise or continuously, although I prefer continuous concurrent flow of reactants using an active aluminum halide catalyst in liquid form, and that certain portions of the apparatus must be constructed of corrosion-resistant material to prevent rapid deterioration thereof from the active halogen compounds present. Many suitable types of apparatus can be constructed readily by one skilled in the art, but my invention will be described in detail in connection with only one of these, as illustrated in Figure 1, to which reference is now made.

The naphtha feed is introduced into the system by means of pump 10 and line 11 and passes into a chamber 12 in which it is mixed with a gaseous activator such as hydrogen chloride supplied by pump 13 through line 14. In the arrangement shown only that portion of the activator which dissolves in the naphtha is allowed to escape from chamber 12, and in the case of hydrogen chloride this is sufficient to supply the necessary amount of activator. In this manner no undissolved gaseous hydrogen chloride is included with the feed stocks to the reaction vessel. However, the activator can be mixed directly with the feed stock or otherwise introduced into the system as long as it enters the reaction zone. When very high pressures are to be used in carrying out the isomerization reaction the pressure in chamber 12 is preferably maintained in an intermediate range, for instance 200 to 300 pounds per square inch. The naphtha now containing dissolved activator is passed through pump 15 and lines 16 and 17 into a reaction zone 18 which, as shown, is a heated elongated coil 19 maintained at the desired reaction temperature. A pressure vessel including stirring equipment may be substituted for reaction zone 18, but the form shown is preferred for continuous operation. In order to maintain the necessary agitation between the catalyst and the other reactants it is necessary that the velocity through coil 19 shall be great enough to insure turbulent flow. Knothole mixers or other baffle arrangements may be inserted in coil 19 at several places to aid in achieving this result. The catalyst is supplied to line 17 and mixed therein with the feed stock by means of pump 20 and lines 21 and 22, and the hydrogen is likewise introduced into line 17 through compressor 23 and lines 24 and 25.

The entire reaction mixture from coil 19 passes through line 26 and cooler 27 to a separator 28 in which the aluminum halide-hydrocarbon complex settles out as a lower layer and is continuously withdrawn through line 29. This complex is preferably recycled at least in part to line 17 through valve 30, line 31, pump 32 and line 22. If desired, however, all of the complex can be withdrawn from the system through valve 33 and line 34, or a portion can be withdrawn and the remainder recycled. The complex withdrawn can, of course, be regenerated and the aluminum halide recovered therefrom and reintroduced into the system through pump 20, or a portion thereof can be treated with water or otherwise to furnish hydrogen halide for use as activator in the process.

The remainder of the products from coil 19 consist essentially of free hydrogen, hydrocarbon naphtha rich in branched-chain paraffin hydrocarbons, and possibly some normally gaseous paraffins such as isobutane formed during the reaction. These are allowed to stratify in separator 28 so that a gaseous phase forms above the liquid hydrocarbon layer. The pressure within separator 28 is maintained as close as possible to the reaction pressure existing within coil 19, although it is obvious that there will be some pressure drop in transferring the reactants from coil 19 to separator 28. The temperature of separation depends to a very considerable extent upon the character of the feed stock and the pressure, but generally it will lie within the range from about 50° F. to about 150° F., under which conditions very substantial quantities of the free hydrogen formerly in solution are released as a gas. For instance, as shown in Figure 2, if the reaction mixture contains 10 volumes of hydrogen per volume of naphtha at a pressure of 700 pounds per square inch and 300° F. and the temperature is then lowered to about 100° F. while the pressure is held constant, there will be released from the reaction mixture approximately 3 volumes of hydrogen, which is relatively pure and available at high pressure for recycling. Likewise, if the reaction conditions are 350° F. and 1000 pounds per square inch, and approximately 18 volumes of hydrogen are present, cooling to 100° F. without pressure reduction will yield a gas very rich in free hydrogen to the extent of about 8 volumes per volume of naphtha. This hydrogen-rich gas is withdrawn from the top of separator 28 and returned to reaction zone 18 by means of line 35, pump 36, line 25 and line 17.

The hydrocarbon layer is removed from separator 28 through line 37 and valve 38 and introduced into fractionating tower 39 through a heater 40. Valve 38 is preferably of the pressure-reducing type adjusted to the desired fractionating pressure. Fractionating tower 39 can be of any conventional design provided with a side stream outlet 41 and is operated so that the side stream contains those hydrocarbons having the desired boiling range while the bottoms contain heavier materials. Under some conditions, for instance when the side stream is a closely selected high anti-knock fraction, the fractionating tower bottoms are recycled to the reaction zone 18 through line 42, valve 43, line 44, pump 45, valve 46 and lines 16 and 17. If desired, however, the relatively heavy bottom fraction can be withdrawn from the system through valve 47 and line 48. The desired product in line 41 is passed through a cooler 49 to storage or for other treatment and the more volatile material containing, for example, gases having less than 5 carbon atoms per molecule, additional free hydrogen and possibly some hydrogen halide, is withdrawn as overhead through line 50. This gaseous fraction is preferably recycled to line 17 through valve 51, line 52, pump 53 and line 54. In order that inert gases may be prevented from accumulating in the system, however, a portion of the material in line 50 may be vented either intermittently or continuously through valve 55 and line 56. In that case free hydrogen and/or hydrogen halide can be recovered from the vent gases.

As previously mentioned, small amounts of normal butane or isobutane can be supplied when the reaction temperature is relatively high, for instance 300° F. to 400° F., and this can be done by means of pump 57, line 58 and valve 59. Generally, however, this expedient will be unnecesary when the operation has been carried on for a period of time since sufficient isobutane will be formed and recycled through line 52 to act as an inhibitor effective in suppressing the formation of further quantities of isobutane.

It is apparent that I have described a novel method of isomerizing paraffinic naphthas in the most economical manner and of recycling the hydrogen necessary to insure long catalyst life.

Many modifications of my invention and of the apparatus shown herein for carrying out the same will be apparent to those skilled in the art and they will be able to supply numerous details not illustrated in the drawing, such as heat exchangers, control equipment, etc. For instance, the hydrocarbon product leaving separator 28 through line 37 can be washed with a caustic soda solution or other alkali to remove hydrogen chloride therefrom prior to heating so as to reduce materially corrosion problems in heater 40 and fractionator 39. I do not desire, therefore, to be limited to the specific modifications used in illustrating my invention, but only by the scope of the following claims:

I claim:

1. The process of improving the antiknock value of a substantially saturated naphtha rich in straight-chain paraffin hydrocarbons which comprises contacting an admixture of said naphtha, an active aluminum halide catalyst, and an activator affording a hydrogen halide, and free hydrogen in a reaction zone at a temperature in the range from about 100° F. to about 350° F. and under a pressure in the range from about 500 to about 1500 pounds per square inch, whereby said free hydrogen is largely dissolved in said naphtha, cooling the products from said reaction zone and separating a hydrogen-rich gas therefrom while maintaining the pressure substantially at said reaction pressure, returning at least a substantial part of said hydrogen-rich gas to said reaction zone without pressure reduction, and recovering from the remainder of said products a naphtha fraction rich in branched-chain paraffin hydrocarbons.

2. The process of claim 1 wherein said temperature is in the range from about 200° F. to about 350° F.

3. The process of claim 1 wherein said catalyst is an active aluminum chloride catalyst and said activator is hydrogen chloride.

4. In a continuous process for isomerizing the straight-chain paraffin hydrocarbons in a substantially saturated naphtha fraction, the steps comprising passing an admixture of said naphtha fraction, an active aluminum halide catalyst, an activator affording a hydrogen halide, and free hydrogen through an elongated reaction zone maintained at a temperature in the range from about 100° F. to about 350° F. and under a pressure in the range from about 500 to about 1500 pounds per square inch, whereby said free hydrogen is largely dissolved in said naphtha fraction, cooling the products from said reaction zone and separating therefrom a hydrogen-rich gas, a catalyst-containing portion and a hydrocarbon portion while maintaining substantially said reaction pressure, returning said hydrogen-rich gas to said reaction zone, and recovering a naphtha rich in branched-chain paraffin hydrocarbons from said hydrocarbon portion.

5. A continuous process according to claim 4 wherein said temperature is in the range from about 200° F. to about 350° F., said catalyst includes substantial quantities of a liquid aluminum chloride-hydrocarbon complex, and at least a portion of said catalyst-containing portion is returned to said reaction zone.

6. The process of improving the antiknock value of a substantially saturated petroleum naphtha having an end point below about 158° F. and consisting predominantly of straight-chain paraffin hydrocarbons which comprises contacting an admixture of said naphtha, an active aluminum halide catalyst, an activator affording a hydrogen halide and free hydrogen in a reaction zone maintained at a temperature in the range from about 200° F. to about 350° F. and under a pressure in the range from about 500 to about 1500 pounds per square inch, whereby said free hydrogen is largely dissolved in said naphtha, cooling the products from said reaction zone whereby a hydrogen-rich gas is released from said products, separating said hydrogen-rich gas from the remaining products at a pressure substantially the same as said reaction pressure, returning said separated hydrogen-rich gas to said reaction zone, and recovering an isomerized naphtha fraction from said remaining products.

7. The process of claim 6 wherein from about 10 to about 25 volumes of free hydrogen measured in the gaseous state are present in said reaction zone per volume of liquid naphtha.

8. The process of claim 6 wherein said hydrogen-rich gas is separated at a temperature in the range from about 50° F. to about 150° F.

9. The process of claim 1 wherein from about 10 to about 25 volumes of free hydrogen measured in the gaseous state are present in said reaction zone per volume of liquid naphtha.

WEBSTER B. KAY.